(12) United States Patent
Stephenson et al.

(10) Patent No.: US 8,085,363 B2
(45) Date of Patent: Dec. 27, 2011

(54) COATABLE CONDUCTIVE LAYER

(75) Inventors: Stanley W. Stephenson, Spencerport, NY (US); Mary C. Brick, Webster, NY (US); Terry J. Martin, Rochester, NY (US)

(73) Assignee: Industrial Technology Research Institute, Hsinchu (TW)

( * ) Notice: Subject to any disclaimer, the term of this patent is extended or adjusted under 35 U.S.C. 154(b) by 350 days.

(21) Appl. No.: 11/533,451

(22) Filed: Sep. 20, 2006

(65) Prior Publication Data
US 2007/0013829 A1   Jan. 18, 2007

Related U.S. Application Data

(63) Continuation of application No. 10/832,520, filed on Apr. 27, 2004, now abandoned.

(51) Int. Cl.
*G02F 1/1333* (2006.01)
*G02F 1/135* (2006.01)
*C09K 19/02* (2006.01)

(52) U.S. Cl. ............... 349/86; 349/175; 349/29

(58) Field of Classification Search ............ 349/29
See application file for complete search history.

(56) References Cited

U.S. PATENT DOCUMENTS

| | | | |
|---|---|---|---|
| 2,932,629 A | 4/1960 | Wiley | |
| 3,600,060 A | 8/1971 | Churchill et al. | |
| 3,816,786 A | 6/1974 | Churchill et al. | |
| 3,846,015 A | 11/1974 | Moi | |
| 4,419,279 A * | 12/1983 | Abrams | 252/514 |
| 4,435,047 A | 3/1984 | Fergason | |
| 4,466,701 A | 8/1984 | Ogata et al. | |
| 4,833,060 A | 5/1989 | Nair et al. | |
| 4,965,131 A | 10/1990 | Nair et al. | |
| 5,251,048 A | 10/1993 | Doane et al. | |
| 5,326,687 A | 7/1994 | Texter | |
| 5,437,811 A | 8/1995 | Doane et al. | |
| 5,453,863 A | 9/1995 | West et al. | |

(Continued)

FOREIGN PATENT DOCUMENTS

WO   WO/92/03504   5/1992

(Continued)

OTHER PUBLICATIONS

"Photographic Silver Halide Emulsions, Preparations, Addenda, Processing and Systems," *Research Disclosure* vol. 17643, Part XI, 1978.

(Continued)

*Primary Examiner* — Wen-Ying P Chen
(74) *Attorney, Agent, or Firm* — Alston & Bird LLP

(57) ABSTRACT

The invention relates to a patternable coatable electrically conductive layer comprising a fluid-coated electrically conductive material, wherein the fluid-coated electrically conductive material has sufficient conductivity to induce an electric field strong enough to change the optical state of a light modulating material and a display comprising a substrate, at least one patternable coatable electrically conductive layer comprising a fluid-coated electrically conductive material, wherein said fluid coated electrically conductive material has sufficient conductivity to induce an electric field strong enough to change the optical state of a light modulating material which has a first and a second field-switched stable optical state, and an imaging layer comprising said light modulating material disposed over said at least one patternable fluid-coated electrically conductive layer. The invention also relates to a method for making a coatable electrically conductive layer and a method for making a display with a coatable electrically conductive layer.

13 Claims, 6 Drawing Sheets

U.S. PATENT DOCUMENTS

| | | | |
|---|---|---|---|
| 5,667,853 | A | 9/1997 | Fukuyoshi et al. |
| 5,695,682 | A | 12/1997 | Doane et al. |
| 5,718,992 | A * | 2/1998 | Sato et al. ............ 430/7 |
| 5,963,283 | A | 10/1999 | Omae et al. |
| 6,025,952 | A | 2/2000 | Stephenson |
| 6,061,107 | A | 5/2000 | Yang et al. |
| 6,099,751 | A | 8/2000 | Meyer et al. |
| 6,217,792 | B1 | 4/2001 | Parri et al. |
| 6,236,442 | B1 | 5/2001 | Stephenson et al. |
| 6,394,870 | B1 | 5/2002 | Petruchik et al. |
| 6,423,368 | B1 | 7/2002 | Stephenson et al. |
| 6,556,262 | B1 | 4/2003 | Stephenson et al. |
| 2001/0004108 | A1 | 6/2001 | Iwamatsu et al. |
| 2001/0012081 | A1 * | 8/2001 | Chaudhari et al. ............ 349/123 |
| 2001/0032970 | A1 | 10/2001 | Yukinobu et al. |
| 2001/0040656 | A1 * | 11/2001 | Na et al. ............ 349/110 |
| 2002/0011777 | A1 | 1/2002 | Konishi et al. |
| 2002/0017857 | A1 | 2/2002 | Hashimoto et al. |
| 2002/0044243 | A1 | 4/2002 | Kim et al. |
| 2002/0167619 | A1 | 11/2002 | Bietsch et al. |
| 2003/0019575 | A1 * | 1/2003 | Smith et al. ............ 156/326 |
| 2003/0034945 | A1 | 2/2003 | Mi et al. |
| 2003/0038912 | A1 | 2/2003 | Broer et al. |
| 2003/0063245 | A1 | 4/2003 | Bowley et al. |
| 2003/0117548 | A1 * | 6/2003 | Stephenson ............ 349/86 |
| 2003/0148024 | A1 | 8/2003 | Kodas et al. |
| 2003/0153141 | A1 | 8/2003 | Carter et al. |
| 2003/0164915 | A1 | 9/2003 | Fujiwara et al. |
| 2003/0174264 | A1 | 9/2003 | Stephenson et al. |
| 2004/0032545 | A1 * | 2/2004 | Stephenson et al. ............ 349/86 |
| 2004/0246411 | A1 * | 12/2004 | Stephenson et al. ............ 349/113 |
| 2005/0026037 | A1 | 2/2005 | Riley et al. |

FOREIGN PATENT DOCUMENTS

| | | |
|---|---|---|
| WO | WO/92/09367 | 11/1992 |
| WO | WO/92/19695 | 11/1992 |
| WO | WO/93/23496 | 11/1993 |
| WO | WO/99/36261 | 7/1999 |

OTHER PUBLICATIONS

G. Gottarelli et al. "Induced Cholesteric Mesophases: Origin and Application," *Molecular Crystals and Liquid Crystals*, vol. 123, p. 377, 1985

U.S. Appl. No. 10/651,692, filed Apr. 7, 2005, Welter et al.

G. Spada et al. "The Nematic Liquid Crystal Phase as a Probe of the Molecular Shape Helicity," *Enantiomer*, 3, 310, pp. 301-314, 1998.

Blinov L.M. "Electro-optical and Magneto-Optical Properties of Liquid Crystals," pp. 212-217, *John Wiley & Sons Ltd.*, 1983.

Yang et al. "Cholesteric liquid crystal/polymer dispersion for haze-free light shutters," *Applied Physics Letters* 60 (25) pp. 3102-3104, 1992.

Yang et al. "Control of reflectivity and bistability in displays using cholesteric liquid crystals," *Applied Physics* 76 (2) p. 1331, 1994.

Anaheim "A new Conductor structure for Plastic LCD Applications Utilizing 'All Dry' Digital Laser patterning," *SID International Symposium Digest of Technical Papers*, vol. 29, pp. 1099-1101, 1998.

W. Herbst et al. "Industrial Organic Pigments: Production, Properties, Applications," *Wiley Publishers*, 1993.

"Photographic Silver Halide Emulsions, Preparations, Addenda, Processing and Systems," *Research Disclosure* vol. 308, Item 308119, pp. 1007-1008, 1989.

Final Office Action mailed Apr. 5, 2011 in connection with U.S. Appl. No. 12/272,647, filed Nov. 17, 2008.

Office Action from related U.S. Appl. No. 12/272,647 mailed Jun. 9, 2011.

Office Action for U.S. Appl. No. 12/272,647 dated Mar. 9, 2010.

Final Office Action for U.S. Appl. No. 12/272,647 dated Jul. 16, 2010.

Office Action for U.S. Appl. No. 12/272,647 dated Jan. 31, 2011.

Final Office Action for U.S. Appl. No. 12/272,647 dated Apr. 5, 2011.

Office Action for U.S. Appl. No. 12/272,647 dated Jun. 9, 2011.

* cited by examiner

PLANAR           FOCAL-CONIC

COATABLE CONDUCTIVE LAYER

CROSS REFERENCE TO RELATED APPLICATIONS

This is a continuation of application Ser. No. 10/832,520, filed Apr. 27, 2004 now abandoned.

FIELD OF THE INVENTION

The present invention relates to forming coatable conductive electrodes for flexible displays.

BACKGROUND OF THE INVENTION

Currently, information is displayed using assembled sheets of paper carrying permanent inks or displayed on electronically modulated surfaces such as cathode ray displays or liquid crystal displays. Printed information displayed in these manners cannot be changed. Devices that allow for the modification of information, such as electrically updated displays, are often heavy and expensive. Information may also be applied to sheet materials via magnetically written areas, for example, to carry ticketing or financial information. Such magnetically written data, however, is not visible.

Media systems exist that maintain electronically changeable data without power. Such system can be electrophoretic (E-ink), Gyricon, or polymer dispersed cholesteric materials. An example of such electronically updateable displays can be found in U.S. Pat. No. 3,600,060, which shows a device having a coated, then dried emulsion of cholesteric liquid crystals in aqueous gelatin to form a field-responsive, bistable display. U.S. Pat. No. 3,816,786 also discloses a layer of encapsulated cholesteric liquid crystal responsive to an electric field. The electrodes in the patent can be transparent or non-transparent and formed of various metals or graphite. It is disclosed that one electrode must be light absorbing, and it is suggested that the light absorbing electrode be prepared from paints containing conductive material such as carbon.

Fabrication of flexible, electronically written display sheets is disclosed in U.S. Pat. No. 4,435,047. A substrate supports a first conductive electrode, one or more layers of encapsulated liquid crystals, and a second electrode of electrically conductive ink. The conductive inks form a background for absorbing light, so that the information-bearing display areas appear dark in contrast to background non-display areas. Electrical potential applied to opposing conductive areas operates on the liquid crystal material to expose display areas. Because the liquid crystal material is nematic liquid crystal, the display ceases to present an image when de-energized, that is, in the absence of a field. A first flexible substrate is patterned which is coated. A second pre-patterned substrate is bonded over the coating.

U.S. Pat. No. 5,251,048 discloses a light-modulating cell having a polymer-dispersed chiral-nematic liquid crystal. The chiral-nematic liquid crystal has the property of being electrically driven between a planar state, reflecting a specific visible wavelength of light, and a focal-conic state, transmitting forward scattering light. Chiral-nematic liquid crystals, also known as cholesteric liquid crystals, potentially in some circumstances have the capacity of maintaining one of multiple given states in the absence of an electric field. Black paint can be applied to the outer surface of a rear substrate to provide a light-absorbing layer forming a non-changing background outside of a changeable display area defined by the intersection of segment lines and scanning lines. A first glass substrate is patterned. A second patterned glass substrate is fixable spaced from the first substrate. The cavity is filled with liquid crystal.

U.S. Pat. No. 6,025,952 discloses a sheet having a light sensitive layer that can be patterned to form conductors that respond to electrical signals to operate on a light-modulating layer. The light-modulating layer is polymer dispersed liquid crystal and the light patterned conductor layer is silver halide layer. A sheet made according to the invention requires a light exposure step and subsequent silver halide processing. Silver halide processing requires repeated chemical diffusion processes.

U.S. Pat. No. 6,236,442 discloses a display sheet with a metallic conductive layer over a light modulating layer. The conductive layer is formed by vacuum depositing a continuous metallic layer and laser patterning the metallic layer to form segment electrodes. However, vacuum deposited conductive layers are expensive and fragile.

U.S. Pat. No. 6,394,870 discloses directly depositing opaque conductive ink in an image wise pattern by screen-printing. Screen-printing is sensitive to ink formulation, adhesion and printing process parameters. The inks require secondary processes, such as heating or ultra-violet curing to set. The materials can contain polymeric binders that are personally and environmentally harmful. Screens utilizing this technology have limited life and require periodic cleaning. Such processes can take many seconds to deposit the material. It would be useful to provide environmentally safe materials with a fast, dry patterning process.

U.S. Pat. application Ser. No. 2003/0174264 A1 discloses that polymer dispersed liquid crystal materials can be coated on photographic machinery as part of a multiple layer coating. Such coatings require subsequent application of conductors. It would be useful to apply a conductive coating simultaneous with the deposition of the polymer dispersed liquid crystal layer.

PROBLEM TO BE SOLVED

There is a need for a display using polymer-dispersed cholesteric liquid crystal material having a conductor that can be applied without the use of vacuum coatings. It would be of further use if such a layer could be patterned without the need for diffusive solution baths or patterned ink printing.

SUMMARY OF THE INVENTION

The present invention relates to a patternable coatable electrically conductive layer comprising a fluid-coated electrically conductive material, wherein the electrically conductive material has sufficient conductivity to induce an electric field strong enough to change the optical state of a light modulating material. The present invention also relates to a display comprising a substrate; at least one patternable coatable electrically conductive layer comprising a fluid-coated electrically conductive material, wherein the fluid-coated electrically conductive material has sufficient conductivity to induce an electric field strong enough to change the optical state of a light modulating material, and an imaging layer comprising the light modulating material disposed over the at least one patternable fluid-coated electrically conductive layer, wherein the light modulating material has a first and a second field-switched stable optical state. In addition, the invention relates to a method for making a coatable electrically conductive layer comprising providing a substrate and coating thereon an electrically conductive layer comprising a fluid-coated electrically conductive material, wherein the fluid-coated electrically conductive material has sufficient conductivity to induce an electric field strong enough to change the optical state of a light modulating material and a method for making a display comprising providing a substrate, applying a patterned conductive layer thereto, coating a light modulating layer onto the conductive layer and coating thereon a coatable electrically conductive layer comprising a fluid-coated electrically conductive material, wherein the fluid-coated electrically conductive material has sufficient conductivity to induce an electric field strong enough to change the optical state of a light modulating material.

ADVANTAGEOUS EFFECT OF THE INVENTION

The present invention includes several advantages, not all of which are incorporated in a single embodiment. The present invention eliminates vacuum deposited conductors, printing machinery and chemical development. The invention has the advantage that a liquid coating can be applied over an optical layer to create a patterned conductive layer.

DETAILED DESCRIPTION OF THE INVENTION

Figure 1:
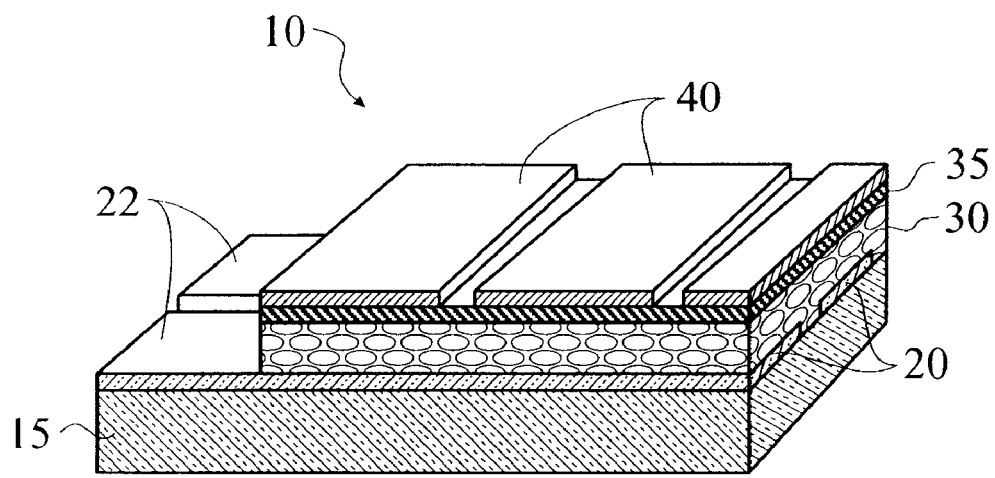
FIG. 1 is a perspective of a display in accordance with the present invention.

The present invention relates to a fluid-coated conductive layer, preferably for use in liquid crystal display applications. The fluid-coated conductive layer preferably has sufficient conductivity to induce an electric field across a layer positioned next to the coated conductive layer. In a preferred embodiment, the fluid-coated conductive layer has sufficient conductivity to induce an electric field strong enough to change the optical state of the light modulating material.

As referred to herein, a coated layer refers to a thin layer covering a substrate or other layer. Coating refers to the act of applying a coating to a substrate or other layer, putting a coat on a substrate or other layer, or covering a surface. Coatings apply an unpatterned continuum across a specific area. This is different that printing, as printing is defined to mean producing written or print characters, which are multiple patterned areas, produced by means of or the result of printing or producing visible indication made on a surface.

In this invention, the coated conductors are conductive materials that are preferably fluid coated, dried and patterned. Preferably, the conductive material in the fluid-coated conductive layer has a conductivity of less than $10^4$ ohms/sq. In the specific embodiment, the coated conductive layer is formed into discrete patterns using actinic radiation, preferably a laser. Fluid coating refers to the application of a material in a solvent or dispersing medium, which solvent or dispersing medium is later removed to produce the final applied layer of material. Preferably, the fluid is water or an organic solvent.

In one embodiment, fine conductive particles are suspended in the fluid with a binding agent, also referred to herein as a binder. Particles in the invention must be fine enough to stay in suspension during a coating process, and provide a sufficiently conductive surface with a coating thickness thin enough to be laser etched when used to form second conductors without damage to first transparent conductors. In a preferred embodiment, the fluid-coated material may be fine metallic particles or flakes suspended in a gelatin solution. Preferably, the particles have a diameter of less than 1 micron, and more preferably, a diameter of less than 50 nm. However, any size particle may be utilized, provided it is able to remain suspended in the coating.

The fine conductive particles useful in the application may include silver, silver plated copper particles, nickel, gold, palladium, carbon or combinations of the materials. Preferred materials may include particles, such as silver, nickel or chrome. The material selected should resist oxidation and be low cost. Precious metals such as palladium and gold resist oxidation, but are expensive. Fine silver particles are preferred in the embodiment because silver is a lower cost precious metal, silver is highly conductive and oxide coatings on silver are conductive.

Fine particulate silver can be formed by flame spray separation, continuous vapor deposition or chemical precipitation. Chemical precipitation methods can include forming fine silver-halide grains, that are developed and separated from the resulting salts to form silver particles having a diameter of less between 0.5 and 2.0 micron, preferably less than 2.0 microns, more preferably, less than 1 micron. The silver particles may also preferably measure less than 10 cubic microns across the major length. Materials formed by chemical precipitation require extensive chemical processing, and are significantly more expensive than directly formed particles. Silver in that size range precipitates slowly enough for machine coating and is relatively inexpensive.

Alternatively, the fluid can contain a soluble or insoluble polymeric conductor such as doped polypyrrole in solution with the solvent. In another embodiment, the coating solution contains an organic conductor. In another embodiment, the coating solution is an organic conductor, such as doped polypyrrole along with conductive particles in suspension with the dissolved organic conductor. Coated conductive layers can also be formed by printing a transparent organic conductor such as PEDT/PSS, PEDOT/PSS polymer, which materials are sold as Baytron® P by Bayer AG Electronic Chemicals.

The binding agent or binder is preferably polymeric. The binder may be a hydrophilic binder and may include both naturally occurring substances such as proteins, protein derivatives, cellulose derivatives (e.g. cellulose esters), gelatins and gelatin derivatives, polysaccaharides, casein, and the like, and synthetic water permeable colloids such as poly (vinyl lactams), acrylamide polymers, poly(vinyl alcohol) and its derivatives, hydrolyzed polyvinyl acetates, polymers of alkyl and sulfoalkyl acrylates and methacrylates, polyamides, polyvinyl pyridine, acrylic acid polymers, maleic anhydride copolymers, polyalkylene oxide, methacrylamide copolymers, polyvinyl oxazolidinones, maleic acid copolymers, vinyl amine copolymers, methacrylic acid copolymers, acryloyloxyalkyl acrylate and methacrylates, vinyl imidazole copolymers, vinyl sulfide copolymers, and homopolymer or copolymers containing styrene sulfonic acid. Gelatin is preferred for compatibility with liquid crystal materials also dispersed in gelatin.

A light-modulating layer is defined herein as an electrical field responsive material that changes optical state in response to an electrical field. Possible materials can be electrophoretic materials or liquid crystal materials. Liquid crystal materials can be nematic materials, polymer dispersed liquid crystals. Some of these materials maintain multiple optical states in the absence of an electrical field. These materials can be dispersed in polymer using a variety of means to form a polymer dispersed electro-optical layer requiring a second electrode. In a preferred embodiment, light modulating material is cholesteric liquid crystal material, such as those disclosed in U.S. Pat. No. 5,695,682, the disclosure of which is incorporated by reference.

As used herein, the phase a "liquid crystal display" (LCD) is a type of flat panel display used in various electronic devices. At a minimum, an LCD comprises a substrate, at least one conductive layer and a liquid crystal layer. The sheets of polarizing material may comprise a substrate of glass or transparent plastic. The LCD may also include functional layers. In another embodiment, a display comprises a substrate, at least one transparent conductor, an imaging layer comprising a light modulating material disposed over the conductor, wherein the light modulating material has the property of having a first and second field-switched stable optical states. In another embodiment, the display further comprises a second conductor.

Cholesteric liquid crystal materials may be made using highly anisotropic nematic liquid crystal mixtures and adding a chiral doping agent to provide helical twist in the planes of the liquid crystal to the point that interference patterns are created that reflect incident light. Chiral nematic liquid crystal refers to the type of liquid crystal having finer pitch than that of twisted nematic and super-twisted nematic used in commonly encountered LC devices. Chiral nematic liquid crystals may be used to produce bi-stable or multi-stable displays. Application of electrical fields of various intensity and duration can be employed to drive a chiral-nematic (cholesteric) material into a reflective state, to near-transparent or transmissive state, or an intermediate state. These materials have the advantage of having first and second optical states that are both stable in the absence of an electrical field. These devices have significantly reduced power consumption due to their non-volatile "memory" characteristic. Liquid crystals can be nematic (N), chiral nematic (N*), or smectic, depending upon the arrangement of the molecules in the mesophase. Chiral nematic liquid crystal (N*LC) displays are typically reflective, that is, no backlight is needed, and can function without the use of polarizing films, alignment layers or a color filter.

Since such displays do not require a continuous driving circuit to maintain an image, they consume significantly reduced power when infrequently addressed. Chiral nematic displays are bistable in the absence of a field; the two stable textures are the reflective planar texture and the weakly scattering focal conic texture. In the planar texture, the helical axes of the chiral nematic liquid crystal molecules are substantially perpendicular to the substrate upon which the liquid crystal is disposed. In the focal conic state the helical axes of the liquid crystal molecules are generally randomly oriented. Adjusting the concentration of chiral dopants in the chiral nematic material modulates the pitch length of the mesophase and, thus, the wavelength of reflected radiation. Chiral nematic materials that reflect infrared radiation and ultraviolet have been used for purposes of scientific study. Commercial displays are most often fabricated from chiral nematic materials that reflect visible light. Some known LCD devices include chemically-etched, transparent, conductive layers overlying a glass substrate as described in U.S. Pat. No. 5,667,853, incorporated herein by reference.

In one embodiment, a chiral-nematic liquid crystal composition may be dispersed in a polymer matrix. Such materials are referred to as "polymer-dispersed liquid crystal" materials or "PDLC" materials. Such materials can be made by a variety of methods.

Liquid crystals have bulk properties equivalent to fluids at room temperature. Polymer dispersed liquid crystal domains are areas of liquid crystal existing in a matrix of polymeric material with more rigid properties. In one case, liquid crystal material exists as individual droplets in a rigid polymer matrix. In another case, liquid crystal material is suspended in a mesh of polymeric threads. The PDLC can be formed by conventional emulsions formed wherein one of two immiscible fluids is a liquid crystal. The second fluid can contain a polymer in solution. The emulsion can be coated and dried to create a layer having individual droplets of liquid crystal supported by a dried polymer matrix. Alternatively, a monomer can be dissolved in the liquid crystal material and polymerized to create separated droplets of liquid crystal material or ordered threads of polymer within the liquid crystal medium.

In the preferred embodiment, domains are formed using the limited coalescence technique described in as disclosed in U.S. Pat. Nos. 6,556,262 and 6,423,368, incorporated by reference. Preferably, the domains are flattened spheres and have on average a thickness substantially less than their length, preferably at least 50% less. More preferably, the domains on average have a thickness (depth) to length ratio of 1:2 to 1:6. The flattening of the domains can be achieved by proper formulation and drying in a viscous state. The domains preferably have an average diameter of 2 to 30 microns. The imaging layer preferably has a thickness of 10 to 150 microns when first coated and 2 to 20 microns when dried. In a preferred embodiment of the invention, the display device or display sheet has simply a single imaging layer of liquid crystal material along a line perpendicular to the face of the display, preferably a single layer coated on a flexible substrate. Such as structure, as compared to vertically stacked imaging layers each between opposing substrates, is especially advantageous for monochrome shelf labels and the like. Structures having stacked imaging layers, however, are optional for providing additional advantages in some case.

The flattened domains of liquid crystal material can be defined as having a major axis and a minor axis. In a preferred embodiment of a display or display sheet, the major axis is larger in size than the cell (or imaging layer) thickness for a majority of the domains. Such a dimensional relationship is shown in U.S. Pat. No. 6,061,107, hereby incorporated by reference in its entirety.

The contrast of the display may be degraded if there is more than a substantial monolayer of N*LC domains. In a preferred embodiment, the liquid crystalline material comprises a substantial monolayer. The term "substantial monolayer" is defined by the Applicants to mean that, in a direction perpendicular to the plane of the display, there is no more than a single layer of domains sandwiched between the electrodes at most points of the display (or the imaging layer), preferably at 75 percent or more of the points (or area) of the display, most preferably at 90 percent or more of the points (or area) of the display. In other words, at most, only a minor portion (preferably less than 10 percent) of the points (or area) of the display has more than a single domain (two or more domains) between the electrodes in a direction perpendicular to the plane of the display, compared to the amount of points (or area) of the display at which there is only a single domain between the electrodes.

The amount of material needed for a monolayer can be accurately determined by calculation based on individual domain size, assuming a fully closed packed arrangement of domains. (In practice, there may be imperfections in which gaps occur and some unevenness due to overlapping droplets or domains.) On this basis, the calculated amount is preferably less than about 150 percent of the amount needed for monolayer domain coverage, preferably not more than about 125 percent of the amount needed for a monolayer domain coverage, more preferably not more than 110 percent of the amount needed for a monolayer of domains. Furthermore, improved viewing angle and broadband features may be obtained by appropriate choice of differently doped domains based on the geometry of the coated droplet and the Bragg reflection condition.

Liquid crystal domains may be preferably made using a limited coalescence methodology, as disclosed in U.S. Pat. Nos. 6,556,262 and 6,423,368, incorporated herein by reference. Limited coalescence is defined as dispersing a light-modulating material below a given size, and using coalescent limiting material to limit the size of the resulting domains. By use of the term "uniform domains", it is meant that domains are formed having a domain size variation of less than 2:1. Limited domain materials may have improved optical properties.

Limited coalescence is defined as providing an immiscible, field responsive light-modulating material along with a quantity of colloidal particles dispersed in an aqueous system and blended to form a dispersion of field-responsive, light-modulating material below a coalescence size. When the dispersion, also referred to herein as an emulsion, is dried, a coated material is produced which has a set of uniform domains having a plurality of electrically responsive optical states. The colloidal solid particle, functioning as an emulsifier, limits domain growth from a highly dispersed state. Uniformly sized liquid crystal domains are created and machine coated to manufacture light-modulating, electrically responsive sheets with improved optical efficiency.

Specifically, a liquid crystal material may be dispersed an aqueous bath containing a water-soluble binder material such as de-ionized gelatin, polyvinyl alcohol (PVA) or polyethylene oxide (PEO). Such compounds are machine coatable on equipment associated with photographic films. Preferably, the binder has a low ionic content, as the presence of ions in such a binder hinders the development of an electrical field across the dispersed liquid crystal material. Additionally, ions in the binder can migrate in the presence of an electrical field, chemically damaging the light-modulating layer. The liquid crystal/gelatin emulsion is coated to a thickness of between 5 and 30 microns to optimize optical properties of light modulating layer. The coating thickness, size of the liquid crystal domains, and concentration of the domains of liquid crystal materials are designed for optimum optical properties.

A promoter material, such as a copolymer of adipic acid and 2-(methylamino) ethanol, is added to the aqueous bath to drive the colloidal particles to the liquid-liquid interface. The liquid crystal material is dispersed using ultrasound to create liquid crystal domains. When the ultrasound energy is removed, the liquid crystal material coalesced into domains of uniform size.

Domains of a limited coalescent material maintain their uniform size after the addition of the surfactant and after being machine coated. There are few, if any, domains outside narrow limits on a mean droplet size having undesirable electro-optical properties within the dried coatings produced by the limited coalescence method. Conventionally dispersed cholesteric materials contain parasitic domains, which reflect light in wavelengths outside the wavelengths reflected by the cholesteric material. Limited coalescent dispersions have reduced reflection in other wavelengths due to the elimination of parasitic domains. The increased purity of color is important in the development of full color displays requiring well-separated color channels to create a full-color image. Limited coalescent cholesteric materials provide purer light reflectance than cholesteric liquid crystal material dispersed by conventional methods. Such materials may be produced using conventional photographic coating machinery.

In order to provide suitable formulations for applying a layer containing the liquid crystal domains, the dispersions are combined with a hydrophilic colloid, gelatin being the preferred material. Surfactants may be included with the dispersion prior to the addition of gelatin in order to prevent the removal of the particulate suspension stabilizing agent from the droplets. This aids in preventing further coalescence of the droplets.

As for the suspension stabilizing agents that surround and serve to prevent the coalescence of the droplets, any suitable colloidal stabilizing agent known in the art of forming polymeric particles by the addition reaction of ethylenically unsaturated monomers by the limited coalescence technique can be employed, such as, for example, inorganic materials such as, metal salt or hydroxides or oxides or clays, organic materials such as starches, sulfonated crosslinked organic homopolymers and resinous polymers as described, for example, in U.S. Pat. No. 2,932,629; silica as described in U.S. Pat. No. 4,833,060; copolymers such as copoly(styrene-2-hydroxyethyl methacrylate-methacrylic acid-ethylene glycol dimethacrylate) as described in U.S. Pat. No. 4,965,131, all of which are incorporated herein by reference. Silica is the preferred suspension stabilizing agent.

Suitable promoters to drive the suspension stabilizing agent to the interface of the droplets and the aqueous phase include sulfonated polystyrenes, alginates, carboxymethyl cellulose, tetramethyl ammonium hydroxide or chloride, triethylphenyl ammonium hydroxide, triethylphenyl ammonium hydroxide, triethylphenyl ammonium chloride, diethylaminoethylmethacrylate, water-soluble complex resinous amine condensation products, such as the water soluble condensation product of diethanol amine and adipic acid, such as poly(adipic acid-co-methylaminoethanol), water soluble condensation products of ethylene oxide, urea, and formaldehyde and polyethyleneimine; gelatin, glue, casein, albumin, gluten, and methoxycellulose. The preferred promoter is triethylphenyl ammonium chloride.

In order to prevent the hydrophilic colloid from removing the suspension stabilizing agent from the surface of the droplets, suitable anionic surfactants may be included in the mixing step to prepare the coating composition such as polyisopropyl naphthalene-sodium sulfonate, sodium dodecyl sulfate, sodium dodecyl benzene sulfonate, as well as those anionic surfactants set forth in U.S. Pat. No. 5,326,687 and in Section XI of Research Disclosure 308119, December 1989, entitled "Photographic Silver Halide Emulsions, Preparations, Addenda, Processing, and Systems", both of which are incorporated herein by reference. Aromatic sulfonates are more preferred and polyisopropyl naphthalene sulfonate is most preferred.

Suitable hydrophilic binders for use in the liquid crystal layer may include both naturally occurring substances such as proteins, protein derivatives, cellulose derivatives (e.g. cellulose esters), gelatins and gelatin derivatives, polysaccaharides, casein, and the like, and synthetic water permeable colloids such as poly(vinyl lactams), acrylamide polymers, poly(vinyl alcohol) and its derivatives, hydrolyzed polyvinyl acetates, polymers of alkyl and sulfoalkyl acrylates and methacrylates, polyamides, polyvinyl pyridine, acrylic acid polymers, maleic anhydride copolymers, polyalkylene oxide, methacrylamide copolymers, polyvinyl oxazolidinones, maleic acid copolymers, vinyl amine copolymers, methacrylic acid copolymers, acryloyloxyalkyl acrylate and methacrylates, vinyl imidazole copolymers, vinyl sulfide copolymers, and homopolymer or copolymers containing styrene sulfonic acid. Gelatin is preferred.

Modem chiral nematic liquid crystal materials usually include at least one nematic host combined with a chiral dopant. In general, the nematic liquid crystal phase is composed of one or more mesogenic components combined to provide useful composite properties. Many such materials are available commercially. The nematic component of the chiral nematic liquid crystal mixture may be comprised of any suitable nematic liquid crystal mixture or composition having appropriate liquid crystal characteristics. Nematic liquid crystals suitable for use in the present invention are preferably composed of compounds of low molecular weight selected from nematic or nematogenic substances, for example from the known classes of the azoxybenzenes, benzylideneanilines, biphenyls, terphenyls, phenyl or cyclohexyl benzoates, phenyl or cyclohexyl esters of cyclohexanecarboxylic acid; phenyl or cyclohexyl esters of cyclohexylbenzoic acid; phenyl or cyclohexyl esters of cyclohexylcyclohexanecarboxylic acid; cyclohexylphenyl esters of benzoic acid, of cyclohexanecarboxyiic acid and of cyclohexylcyclohexanecarboxylic acid; phenyl cyclohexanes; cyclohexyibiphenyls; phenyl cyclohexylcyclohexanes; cyclohexylcyclohexanes; cyclohexylcyclohexenes; cyclohexylcyclohexylcyclohexenes; 1,4-bis-cyclohexylbenzenes; 4,4-bis-cyclohexylbiphenyls; phenyl- or cyclohexylpyrimidines; phenyl- or cyclohexylpyridines; phenyl- or cyclohexylpyridazines; phenyl- or cyclohexyidioxanes; phenyl- or cyclohexyl-1,3-dithianes; 1,2-diphenylethanes; 1,2-dicyclohexylethanes; 1-phenyl-2-cyclohexylethanes; 1-cyclohexyl-2-(4-phenylcyclohexyl)ethanes; 1-cyclohexyl-2',2-biphenylethanes; 1-phenyl-2-cyclohexylphenylethanes; optionally halogenated stilbenes; benzyl phenyl ethers; tolanes; substituted cinnamic acids and esters; and further classes of nematic or nematogenic substances. The 1,4-phenylene groups in these compounds may also be laterally mono- or difluorinated. The liquid crystalline material of this preferred embodiment is based on the achiral compounds of this type. The most important compounds, that are possible as components of these liquid crystalline materials, can be characterized by the following formula R'-X-Y-Z-R" wherein X and Z, which may be identical or different, are in each case, independently from one another, a bivalent radical from the group formed by -Phe-, -Cyc-, -Phe-Phe-, -Phe-Cyc-, -Cyc-Cyc-, -Pyr-, -Dio-, -B-Phe- and -B-Cyc-; wherein Phe is unsubstituted or fluorine-substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl, and B is 2-(trans-1,4-cyclohexyl)ethyl, pyrimidine-2,5-diyl, pyridine-2,5-diyl or 1,3-dioxane-2,5-diyl. Y in these compounds is selected from the following bivalent groups —CH=CH—, —C≡C—, —N=N(O)—, —CH=CY'—, —CH=N(O)—, —CH2—CH2—, —CO—O—, —CH2—O—, —CO—S—, —CH2—S—, —COO-Phe-COO— or a single bond, with Y' being halogen, preferably chlorine, or —CN; R' and R" are, in each case, independently of one another, alkyl, alkenyl, alkoxy, alkenyloxy, alkanoyloxy, alkoxycarbonyl or alkoxycarbonyloxy with 1 to 18, preferably 1 to 12 C atoms, or alternatively one of R' and R" is —F, —CF3, —OCF3, —Cl, —NCS or —CN. In most of these compounds R' and R' are, in each case, independently of each another, alkyl, alkenyl or alkoxy with different chain length, wherein the sum of C atoms in nematic media generally is between 2 and 9, preferably between 2 and 7. The nematic liquid crystal phases typically consist of 2 to 20, preferably 2 to 15 components. The above list of materials is not intended to be exhaustive or limiting. The lists disclose a variety of representative materials suitable for use or mixtures, which comprise the active element in electro-optic liquid crystal compositions.

Suitable chiral nematic liquid crystal compositions preferably have a positive dielectric anisotropy and include chiral material in an amount effective to form focal conic and twisted planar textures. Chiral nematic liquid crystal materials are preferred because of their excellent reflective characteristics, bi-stability and gray scale memory. The chiral nematic liquid crystal is typically a mixture of nematic liquid crystal and chiral material in an amount sufficient to produce the desired pitch length. Suitable commercial nematic liquid crystals include, for example, E44, E48, E31, E80, BL087, BL101, ZLI-3308, ZLI-3273, ZLI-5048-000, ZLI-5049-100, ZLI-5100-100, ZLI-5800-000, MLC-6041-100.TL202, TL203, TL204 and TL205 manufactured by E. Merck (Darmstadt, Germany). Although nematic liquid crystals having positive dielectric anisotropy, and especially cyanobiphenyls, are preferred, virtually any nematic liquid crystal known in the art, including those having negative dielectric anisotropy should be suitable for use in the invention. Other nematic materials may also be suitable for use in the present invention as would be appreciated by those skilled in the art.

The chiral dopant added to the nematic mixture to induce the helical twisting of the mesophase, thereby allowing reflection of visible light, can be of any useful structural class. The choice of dopant depends upon several characteristics including among others its chemical compatibility with the nematic host, helical twisting power, temperature sensitivity, and light fastness. Many chiral dopant classes are known in the art: e.g., G. Gottarelli and G. Spada, *Mol Cryst. Liq. Crys.*, 123, 377 (1985); G. Spada and G. Proni, *Enantiomer*, 3, 301 (1998) and references therein. Typical well-known dopant classes include 1,1-binaphthol derivatives; isosorbide (D-1) and similar isomannide esters as disclosed in U.S. Pat. No. 6,217,792; TADDOL derivatives (D-2) as disclosed in U.S. Pat. No. 6,099,751; and the pending spiroindanes esters (D-3) as disclosed in U.S. patent application Ser. No. 10/651,692 by T. Welter et al., filed Aug. 29, 2003, titled "Chiral Compounds And Compositions Containing The Same," hereby incorporated by reference.

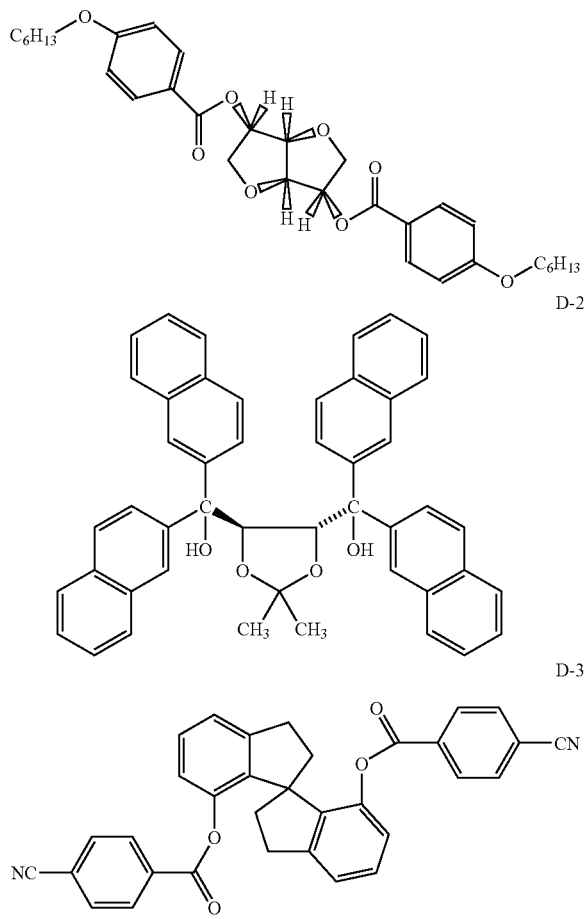

The pitch length of the liquid crystal materials may be adjusted based upon the following equation (1):

$$\lambda_{max} = n_{av} P_0$$

where $\lambda_{max}$ is the peak reflection wavelength, that is, the wavelength at which reflectance is a maximum, $n_{av}$ is the average index of refraction of the liquid crystal material, and $p_0$ is the natural pitch length of the chiral nematic helix. Definitions of chiral nematic helix and pitch length and methods of its measurement, are known to those skilled in the art such as can be found in the book, Blinov, L. M., Electro-optical and Magneto-Optical Properties of Liquid Crystals, John Wiley & Sons Ltd. 1983. The pitch length is modified by adjusting the concentration of the chiral material in the liquid crystal material. For most concentrations of chiral dopants, the pitch length induced by the dopant is inversely proportional to the concentration of the dopant. The proportionality constant is given by the following equation (2):

$$p_0 = 1/(HTP.c)$$

where c is the concentration of the chiral dopant and HTP is the proportionality constant.

For some applications, it is desired to have LC mixtures that exhibit a strong helical twist and thereby a short pitch length. For example in liquid crystalline mixtures that are used in selectively reflecting chiral nematic displays, the pitch has to be selected such that the maximum of the wavelength reflected by the chiral nematic helix is in the range of visible light. Other possible applications are polymer films with a chiral liquid crystalline phase for optical elements, such as chiral nematic broadband polarizers, filter arrays, or chiral liquid crystalline retardation films. Among these are active and passive optical elements or color filters and liquid crystal displays, for example STN, TN, AMD-TN, temperature compensation, polymer free or polymer stabilized chiral nematic texture (PFCT, PSCT) displays. Possible display industry applications include ultralight, flexible, and inexpensive displays for notebook and desktop computers, instrument panels, video game machines, videophones, mobile phones, hand-held PCs, PDAs, e-books, camcorders, satellite navigation systems, store and supermarket pricing systems, highway signs, informational displays, smart cards, toys, and other electronic devices. The fluid-coated conductive layer may also find application in electroluminescent displays.

Chiral nematic liquid crystal materials and cells, as well as polymer stabilized chiral nematic liquid crystals and cells, are well known in the art and described in, for example, co-pending application Ser. No. 07/969,093 filed Oct. 30, 1992; Ser. No. 08/057,662 filed May 4, 1993; Yang et al., Appl. Phys. Lett. 60(25) pp 3102-04 (1992); Yang et al., J. Appl. Phys. 76(2) pp 1331 (1994); published International Patent Application No. PCT/US92/09367; and published International Patent Application No. PCT/US92/03504, all of which are incorporated herein by reference.

Liquid crystalline materials, often referred to as emulsions, may be machine coatable using coating equipment of the type employed in the manufacture of photographic films.

The flexible plastic substrate can be any flexible self-supporting plastic film that supports the thin conductive metallic film. "Plastic" means a high polymer, usually made from polymeric synthetic resins, which may be combined with other ingredients, such as curatives, fillers, reinforcing agents, colorants, and plasticizers. Plastic includes thermoplastic materials and thermosetting materials.

The flexible plastic film must have sufficient thickness and mechanical integrity so as to be self-supporting, yet should not be so thick as to be rigid. Typically, the flexible plastic substrate is the thickest layer of the composite film in thickness. Consequently, the substrate determines to a large extent the mechanical and thermal stability of the fully structured composite film.

Another significant characteristic of the flexible plastic substrate material is its glass transition temperature (Tg). Tg is defined as the glass transition temperature at which plastic material will change from the glassy state to the rubbery state. It may comprise a range before the material may actually flow. Suitable materials for the flexible plastic substrate include thermoplastics of a relatively low glass transition temperature, for example up to 150° C., as well as materials of a higher glass transition temperature, for example, above 150° C. The choice of material for the flexible plastic substrate would depend on factors such as manufacturing process conditions, such as deposition temperature, and annealing temperature, as well as post-manufacturing conditions such as in a process line of a displays manufacturer. Certain of the plastic substrates discussed below can withstand higher processing temperatures of up to at least about 200° C., some up to 3000-350° C., without damage.

Typically, the flexible plastic substrate is polyethylene terephthalate (PET), polyethylene naphthalate (PEN), polyethersulfone (PES), polycarbonate (PC), polysulfone, a phenolic resin, an epoxy resin, polyester, polyimide, polyetherester, polyetheramide, cellulose acetate, aliphatic polyurethanes, polyacrylonitrile, polytetrafluoroethylenes, polyvinylidene fluorides, poly(methyl (x-methacrylates), an aliphatic or cyclic polyolefin, polyarylate (PAR), polyetherimide (PEI), polyethersulphone (PES), polyimide (PI), Teflon poly(perfluoro-alboxy) fluoropolymer (PFA), poly(ether ether ketone) (PEEK), poly(ether ketone) (PEK), poly(ethylene tetrafluoroethylene)fluoropolymer (PETFE), and poly (methyl methacrylate) and various acrylate/methacrylate copolymers (PMMA). Aliphatic polyolefins may include high density polyethylene (HDPE), low density polyethylene (LDPE), and polypropylene, including oriented polypropylene (OPP). Cyclic polyolefins may include poly(bis(cyclopentadiene)). A preferred flexible plastic substrate is a cyclic polyolefin or a polyester. Various cyclic polyolefins are suitable for the flexible plastic substrate. Examples include Arton® made by Japan Synthetic Rubber Co., Tokyo, Japan; Zeanor T made by Zeon Chemicals L.P., Tokyo Japan; and Topas® made by Celanese A. G., Kronberg Germany. Arton is a poly(bis(cyclopentadiene)) condensate that is a film of a polymer. Alternatively, the flexible plastic substrate can be a polyester. A preferred polyester is an aromatic polyester such as Arylite. Although various examples of plastic substrates are set forth above, it should be appreciated that the substrate can also be formed from other materials such as glass and quartz.

The flexible plastic substrate can be reinforced with a hard coating. Typically, the hard coating is an acrylic coating. Such a hard coating typically has a thickness of from 1 to 15 microns, preferably from 2 to 4 microns and can be provided by free radical polymerization, initiated either thermally or by ultraviolet radiation, of an appropriate polymerizable material. Depending on the substrate, different hard coatings can be used. When the substrate is polyester or Arton, a particularly preferred hard coating is the coating known as "Lintec". Lintec contains UV-cured polyester acrylate and colloidal silica. When deposited on Arton, it has a surface composition of 35 atom % C, 45 atom % O, and 20 atom % Si, excluding hydrogen. Another particularly preferred hard coating is the acrylic coating sold under the trademark "Terrapin" by Tekra Corporation, New Berlin, Wis.

The coated conductive layer of the present invention may be any conductive layer. In one embodiment, the coated conductive layer may be the layer referred to as the first conductive layer. For example, in one embodiment, the light-modulating layer may be coated over a transparent first conductive layer on a polyester display substrate and dried to provide an approximately 9-micrometer thick polymer dispersed cholesteric coating. In other embodiments, the coated conductive layer may be referred to the second (or greater) conductive layer. Both the first and second (or greater) conductive layers may comprise fluid-coated conductive material compositions. For example, a display may comprise a flexible support having a thin first transparent conductors applied thereto, after which a machine-coated cholesteric liquid-crystal layer is applied to the first transparent conductor. A machine coated second conductor, applied to the cholesteric liquid crystal layer permits the fabrication of a low-cost flexible display. Small displays according to the present invention can be used as electronically rewritable tags or labels for inexpensive, rewrite applications.

Other types of conductive layers may be incorporated into displays according to the present invention. These other types of conductive layers may comprise a primary metal oxide, such as indium oxide, titanium dioxide, cadmium oxide, gallium indium oxide, niobium pentoxide and tin dioxide. See, Int. Publ. No. WO 99/36261 by Polaroid Corporation. In addition to the primary oxide, the other conductive layer may also comprise a secondary metal oxide such as an oxide of cerium, titanium, zirconium, hafnium and/or tantalum. See, U.S. Pat. No. 5,667,853 to Fukuyoshi et al. (Toppan Printing Co.) Other transparent conductive oxides include, but are not limited to $ZnO_2$, $Zn_2SnO_4$, $Cd_2SnO_4$, $Zn_2In_2O_5$, $MgIn_2O_4$, $Ga_2O_3$—$In_2O_3$, or $TaO_3$. The other conductive layer or layers may be formed, for example, by a low temperature sputtering technique or by a direct current sputtering technique, such as DC-sputtering or RF-DC sputtering, depending upon the material or materials of the underlying layer. The conductive layer may be a transparent, electrically conductive layer of tin-oxide or indium-tin-oxide (ITO), or a coated organic conductor such as polythiophene. Typically, the other conductive layer (or layers) is sputtered onto the substrate to a resistance of less than 250 ohms per square. Alternatively, the other conductive layer may be an opaque electrical conductor formed of metal such as copper, aluminum or nickel. If the other conductive layer is an opaque metal, the metal can be a metal oxide to create a light absorbing conductive layer.

Indium tin oxide (ITO) is a preferred other conductive material, as it is a cost effective conductor with good environmental stability, up to 90% transmission, and down to 20 ohms per square resistivity. An exemplary preferred ITO layer has a % transmittance (% T) greater than or equal to 80% in the visible region of light, that is, from greater than 400 nm to 700 nm, so that the film will be useful for display applications. In a preferred embodiment, the other conductive layer comprises a layer of low temperature ITO that is polycrystalline. The ITO layer is preferably 10-120 nm in thickness, or more preferably 50-100 nm thick to achieve a resistivity of 20-60 ohms/square on plastic. An exemplary preferred ITO layer is 60-80 nm thick.

The conductive layer or layers are preferably patterned. The conductive layer or layers may preferably be patterned into a plurality of electrodes. The patterned electrodes may be used to form a LCD device. In another embodiment, two conductive substrates are positioned facing each other and cholesteric liquid crystals are positioned therebetween to form a device. The patterned conductive layer or layers may have a variety of dimensions. Exemplary dimensions may include line widths of 10 microns, distances between lines, that is, electrode widths, of 200 microns, depth of cut, that is, thickness of the conductor, of 100 nanometers. Thicknesses on the order of 60, 70, and greater than 100 nanometers are also possible.

The conductive layers may also be patterned by irradiating the multilayered conductor/substrate structure with ultraviolet radiation so that portions of the conductive layer are ablated therefrom. It is also known to employ an infra-red (IR) fiber laser for patterning a metallic conductive layer overlying a plastic film, directly ablating the conductive layer by scanning a pattern over the conductor/film structure. See: Int. Publ. No. WO 99/36261 and "42.2: A New Conductor Structure for Plastic LCD Applications Utilizing 'All Dry' Digital Laser Patterning," 1998 SID International Symposium Digest of Technical Papers, Anaheim, Calif., May 17-22, 1998, no. VOL. 29, May 17, 1998, pages 1099-1101, both incorporated herein by reference.

The display may also contain still other types of conductive layers, such as printed conductive ink. For higher conductivities, these still other conductive layers may comprise a silver-based layer which contains silver only or silver containing a different element such as aluminum (Al), copper (Cu), nickel (Ni), cadmium (Cd), gold (Au), zinc (Zn), magnesium (Mg), tin (Sn), indium (In), tantalum (Ta), titanium (Ti), zirconium (Zr), cerium (Ce), silicon (Si), lead (Pb) or palladium (Pd). In a preferred embodiment, the still other conductive layer may comprise at least one of gold, silver and a gold/silver alloy, for example, a layer of silver coated on one or both sides with a thinner layer of gold. See, Int. Publ. No. WO 99/36261 by Polaroid Corporation. In another embodiment, the still other conductive layer may comprise a layer of silver alloy, for example, a layer of silver coated on one or both sides with a layer of indium cerium oxide (InCeO). See U.S. Pat. No. 5,667,853, incorporated herein in by reference.

A gel sub-layer may be applied over the transparent conductors prior to applying light modulating layers as disclosed in U.S. Pat. No. 6,423,368, hereby incorporated by reference in its entirety.

The LCD may also comprise at least one "functional layer" between layers. The functional layer may comprise a protective layer or a barrier layer. A preferred barrier layer may acts as a gas barrier or a moisture barrier and may comprise SiOx, AlOx or ITO. The protective layer, for example, an acrylic hard coat, functions to prevent laser light from penetrating to functional layers between the protective layer and the substrate, thereby protecting both the barrier layer and the substrate. The functional layer may also serve as an adhesion promoter of the conductive layer to the substrate.

In another embodiment, the polymeric support may further comprise an antistatic layer to manage unwanted charge build up on the sheet or web during roll conveyance or sheet finishing. Since the liquid crystal are switched between states by voltage, charge accumulation of sufficient voltage on the web surface may create an electrical field that when discharged may switch a portion of the liquid crystal. It is well known in the art of photographic web based materials that winding, conveying, slitting, chopping and finishing can cause charge build on many web based substrates. High charge buildup is a particular problem with plastic webs that are conductive on one side but not on the other side. Charges accumulates on one side on the web to the point of discharge and in photographic light sensitive materials that discharge can result in fog which is uncontrolled light exposure as a result of the spark caused from the discharge. Similar precaution and static management is necessary during manufacturing or in end use applications for liquid crystal displays. In another embodiment of this invention, the antistatic layer has a surface resistivity of between $10^5$ to $10^{12}$. Above $10^{12}$, the antistatic layer typically does not provide sufficient conduction of charge to prevent charge accumulation to the point of preventing fog in photographic systems or from unwanted point switching in liquid crystal displays. While layers greater than $10^5$ will prevent charge buildup, most antistatic materials are inherently not that conductive and in those materials that are more conductive than $10^5$, there is usually some color associated with them that will reduce the overall transmission properties of the display. The antistatic layer is separate from the highly conductive layer of ITO and provides the best static control when it is on the opposite side of the web substrate from that of the ITO layer. This may include the web substrate itself.

In a preferred embodiment, a dispersion of fine, inexpensive and environmentally inert conductive particles, such as silver, nickel or chrome, may be coated over a layer of polymer dispersed cholesteric liquid crystal and a nanoparticle non-conductive dark layer. One type of dark layer may be a color contrast layer. Color contrast layers may be radiation reflective layers or radiation absorbing layers. In some cases, the rearmost substrate of each display may preferably be painted black. In the case of the stacked cell display, the contrast may be improved by painting the back substrate of the last visible cell black. In one embodiment, a light absorber may be positioned on the side opposing the incident light. In the fully evolved focal-conic state, the chiral nematic liquid crystal is transparent, passing incident light, which is absorbed by the light absorber to create a black image. Progressive evolution of the focal-conic state causes a viewer to perceive a reflected light that transitions to black as the chiral nematic material changes from planar state to a focal conic state. The transition to the light transmitting state is progressive, and varying the low voltage time permits variable levels of reflection. These variable levels may be mapped out to corresponding gray levels, and when the field is removed, the light-modulating layer maintains a given optical state indefinitely. This process is more fully discussed in U.S. Pat. No. 5,437,811, incorporated herein by reference.

The color contrast layer may also be other colors. In another embodiment, the dark layer comprises milled non-conductive pigments. The materials are milled below 1 micron to form "nano-pigments". Such pigments are effective in absorbing wavelengths of light in very thin or "sub micron" layers. In a preferred embodiment, the dark layer absorbs all wavelengths of light across the visible light spectrum, that is from 400 nanometers to 700 nanometers wavelength. The dark layer may also contain a set or multiple pigment dispersions. For example, three different pigments, such as a Yellow pigment milled to median diameter of 120 nanometers, a magenta pigment milled to a median diameter of 210 nanometers, and a cyan pigment, such as Sunfast® Blue Pigment 15:4 pigment, milled to a median diameter of 110 nanometers are combined. A mixture of these three pigments produces a uniform light absorption across the visible spectrum. Suitable pigments are readily available and are designed to be light absorbing across the visible spectrum. In addition, suitable pigments are inert and do not carry electrical fields.

Suitable pigments used in the color contrast layer may be any colored materials, which are practically insoluble in the medium in which they are incorporated. The preferred pigments are organic in which carbon is bonded to hydrogen atoms and at least one other element such as nitrogen, oxygen and/or transition metals. The hue of the organic pigment is primarily defined by the presence of one or more chromophores, a system of conjugated double bonds in the molecule, which is responsible for the absorption of visible light. Suitable pigments include those described in Industrial Organic Pigments: Production, Properties, Applications by W. Herbst and K. Hunger, 1993, Wiley Publishers. These include, but are not limited to, Azo Pigments such as monoazo yellow and orange, diazo, naphthol, naphthol reds, azo lakes, benzimidazolone, diazo condensation, metal complex, isoindolinone and isoindolinic, polycyclic pigments such as phthalocyanine, quinacridone, perylene, perinone, diketopyrrolopyrrole, and thioindigo, and anthriquinone pigments such as anthrapyrimidine, triarylcarbonium and quinophthalone.

The protective layer useful in the practice of the invention can be applied in any of a number of well-known techniques, such as dip coating, rod coating, blade coating, air knife coating, gravure coating and reverse roll coating, extrusion coating, slide coating, curtain coating, and the like. The lubricant particles and the binder are preferably mixed together in a liquid medium to form a coating composition. The liquid medium may be a medium such as water or other aqueous solutions in which the hydrophilic colloid are dispersed with or without the presence of surfactants.

FIG. 1 is a perspective section view of a display in accordance with the invention. A sheet designated as display 10 is made in accordance with the present invention. Display 10 includes a display substrate 15, which can be a thin transparent polymeric material, such as Kodak Estar® film base formed of polyester plastic that has a thickness of between 20 and 200 micrometers. In an exemplary embodiment, display substrate 15 is a 125-micrometer thick sheet of polyester film base. Other polymers, such as transparent polycarbonate, can also be used.

One or more first transparent conductors 20 are formed on display substrate 15. First transparent conductors 20 can be tin-oxide, indium-tin-oxide (ITO) with ITO being the preferred material. Typically the material of first transparent conductors 20 is sputtered or coated as a layer over display substrate 15 having a resistance of less than 1000 ohms per square. First transparent conductors 20 can be formed in the conductive layer by conventional lithographic or laser etching means. Transparent first transparent conductors 20 can also be formed by printing a transparent organic conductor such as PEDT/PSS, PEDOT/PSS polymer, which materials are sold as Baytron® P by Bayer AG Electronic Chemicals. Portions of light modulating layer 30, dark layer 35 and the conductive continuum are removed, for example, using a solvent to form exposed first conductors 22.

Figure 2:
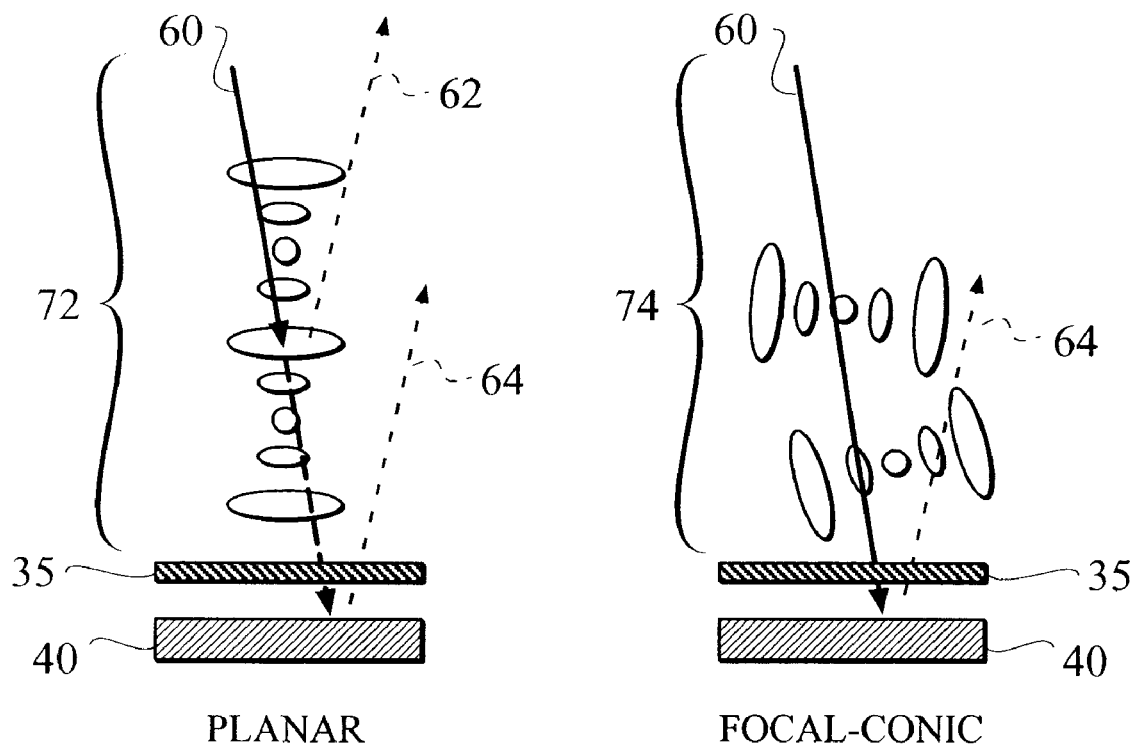
FIG. 2 is a schematic sectional view of a chiral nematic material, respectively, in a planar and focal-conic state responding to incident light.

FIG. 2 is a schematic section view of optical states of one embodiment of a display in accordance with the present invention. The left diagram demonstrates the optical path when the cholesteric material is in a planar state. Incident light 60 strikes planar liquid crystal 72 which reflects a portion of incident light 60 as reflected light 62. The remaining light passes through dark layer 35.

Dark layer 35 can be a complementary light-absorbing dye layer that operates on a portion of the light passing though dark layer 35. Particular wavelengths of light are absorbed, and the remaining light strikes reflective second conductor 40. Light is reflected from second conductor 40 and passes through dark layer 35 a second time, then passes through planar material 72 to become complementary light 64. Complementary light 64, operating in conjunction with cholesteric liquid crystal having peak reflectance near 575 nanometers, forms a substantially color-neutral reflective surface.

On the right side of FIG. 2, the liquid-crystal material is in a focal-conic state 74 and transmits incident light 60. Dark layer 35 provides complementary light 64 when the liquid crystal material is in a focal conic state. As one alternative, dark layer 35 can be a thin, black layer that absorbs across all wavelengths of light. With a panchromatic, black dark layer 35, when the cholesteric material is in the focal-conic state, complementary light does not exist and the image will be essentially black.

In the present embodiment, in FIG. 1, dark layer 35 is coated over light modulating layer 30 to provide a light-absorbing layer that provides a specific contrast state to reflected light. As mentioned above, dark layer 35 can be designed to provide a specific amount of light at wavelengths not operated on by the cholesteric liquid crystal to create a more color-neutral image. The coating can be simultaneous with the deposition of light modulating layer 30 or as a separate step. In the described embodiment, multi-layer coating equipment of the kind used in the photographic industry provides light modulating layer 30 and dark layer 35 as two co-deposited layers. Dark layer 35 is significantly thinner than light modulating layer 30 and has minimal effect on the electrical field strength required to change the state of the cholesteric liquid-crystal material.

Second conductors 40 overlay dark layer 35. Second conductors 40 have sufficient conductivity to induce an electric field across light modulating layer 30 strong enough to change the optical state of the polymeric material. In the general case, the conductivity should at least match the conductivity of the first transparent conductor, which has a sheet resistance of less than 100 ohms per square. In this invention, second conductors 40 are conductive materials that have been coated as a fluid, dried and laser etched. The fluid can be water or an organic solvent. A binding agent is in solution with the solvent, and fine conductive particles are suspended in the fluid. In practice, the volume ratio between a nonconductive binder and the conductive particles should be less than 2 part binder to 1 part conductor.

Aqueous coatings with a gelatin binder with low gelatin concentrations have viscosities below 100 centipoise. It has been found experimentally that particles should have sizes of less than 5 microns and preferably less than 2 microns to stay in suspension for a time period long enough to permit pumping to a coater. Commercial dried silver materials within that size range are available from Ferro Corporation of Cleveland Ohio as SFK-ED, S7000-14, S7000-35 or S11000-25. Metalor Corporation of Neuchatel, Switzerland including C-0083P fine silver, also supplies silver powders useful in the application. Such materials have 90% of the particles less than 2 microns in diameter. It is useful to filter suspensions of such materials through filters passing only particles below 5 microns to ensure the material is delivered to the coating equipment without precipitation.

Conductive layers useful in providing electrical fields which can operate on electrical fields require sheet conductivities less than 500 ohms per square. Conductor layers in this application refer to layers have electrical conductivity sufficient to operate on electro-optical materials and have significantly lower sheet resistance than coated anti-static layers. Second conductors 40 must be thin enough to permit laser etching of the coated conductor without damage to first conductors 20. It is preferable that second conductors be thin enough that there is no visually apparent damage to dark layer 35. The layer thickness for second conductor 4 is preferably below 1 micron in application. The thinness and conductivity requirements practically limit the conductive material to fine silver below 2 microns in diameter.

The use of a flexible support for display substrate 15, thin first transparent conductors 20, machine-coated cholesteric liquid-crystal layer 30, and machine coated second conductors 40 permits the fabrication of a low-cost flexible display. Small displays according to the present invention can be used as electronically rewritable tags or labels for inexpensive, rewrite applications.

The fluid-coated electrically conductive layer and a display containing the same may be formed by providing a substrate and coating thereon an electrically conductive layer comprising a fluid and an electrically conductive material, wherein the electrically conductive material has sufficient conductivity to induce an electric field strong enough to change the optical state of a light modulating material. A light modulating material may be coated between the substrate and the fluid-coated electrically conductive layer. This may be accomplished prior to or simultaneously with the coating of the fluid-coated electrically conductive layer. A patterned conductive layer may also be applied between the substrate and the light modulating material prior to the coating of the liquid crystal layer. A light modulating material may also be coated on top of the fluid-coated electrically conductive layer. In a preferred embodiment, the light modulating material comprises a liquid crystal material.

Figure 3:
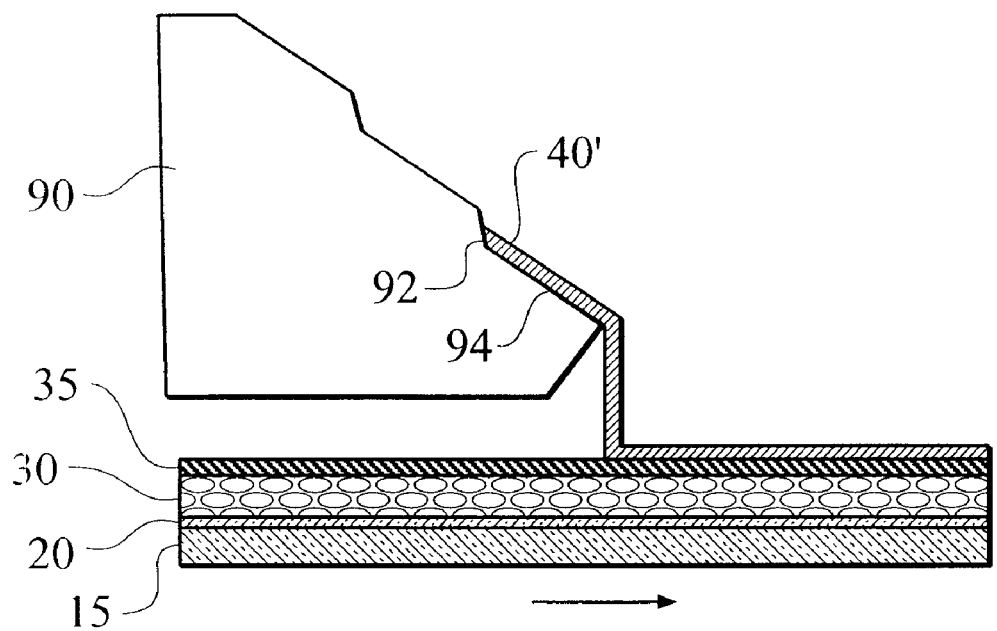
FIG. 3 is a first sectional view of fluidic deposition of a conductive layer.

FIG. 3 is a first sectional view of fluidic deposition of a conductive layer. Substrate 15 supports transparent first conductors 20, light modulating material 30 and dark layer 35. Coating block 90 is a slide coater of conventional design. Fluid second conductor 40' is pumped through a slot 92 and flows in a laminar manner down slope 94 to fall onto dark layer 35 on the web being transported relative to coating block 90. Fluid second conductor 40' can contain gelatin in solution as a binding agent. The gelatin can be chill set, and dried to form a conductive continuum that can be patterned to form second conductors 40.

Figure 4:
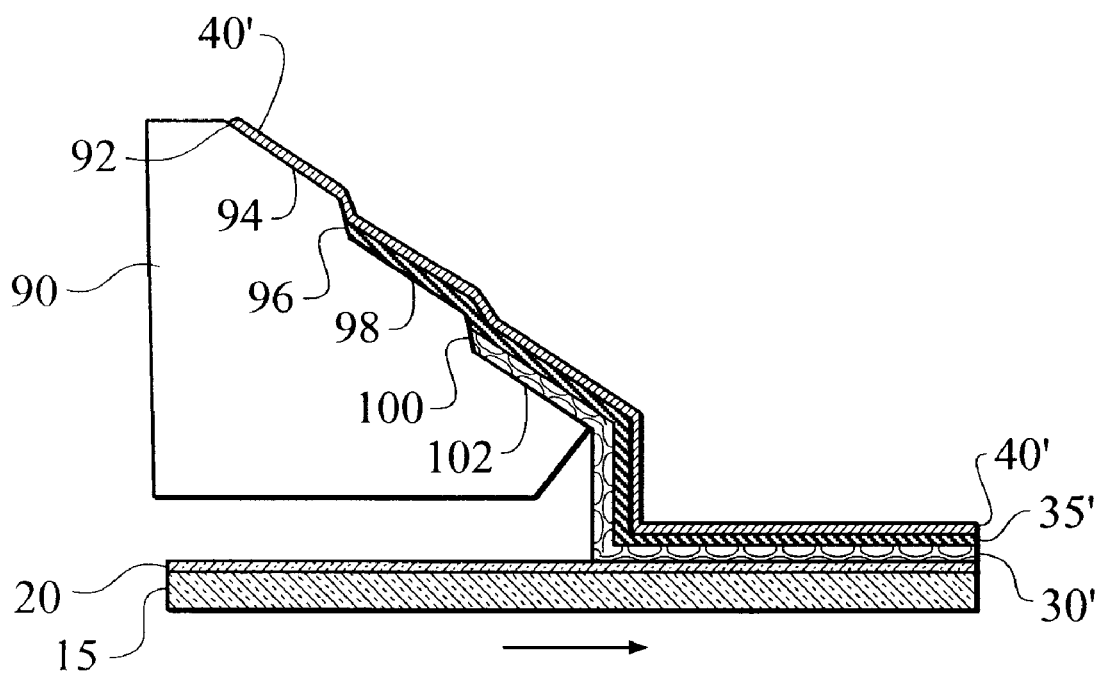
FIG. 4 is a second sectional view of fluidic deposition of a conductive layer.

FIG. 4 is a second sectional view of fluidic deposition of a conductive layer. Substrate 15, having transparent first conductors 20, moves relative to coating block 90. Coating block 90 is a slide coater of conventional design. Fluid second conductor 40' is pumped through a slot 92 and flows in a laminar manner down slope 94. Fluid dark layer 35' is pumped through a second slot 96 downstream of fluid second conductor 40'. Because the two streams are laminar flow, fluid second conductor 40' lays over fluid dark layer 35' without mixing. Fluid light modulating layer 30' is pumped through a third slot 100 further down stream, and the first two layers lay over fluid light modulating layer 30' without mixing. The fluidized layers fall onto transparent second conductors 20 on substrate 15 being transported relative to coating block 90. The three fluid layers can contain gelatin in solution as a binding agent. The gelatin in all three layers can be chill set and dried simultaneously, creating a conductive top layer that can be patterned to form second conductor 40. Multiple layers, greater than three in number, may be deposited simultaneously or sequentially.

Figure 5:
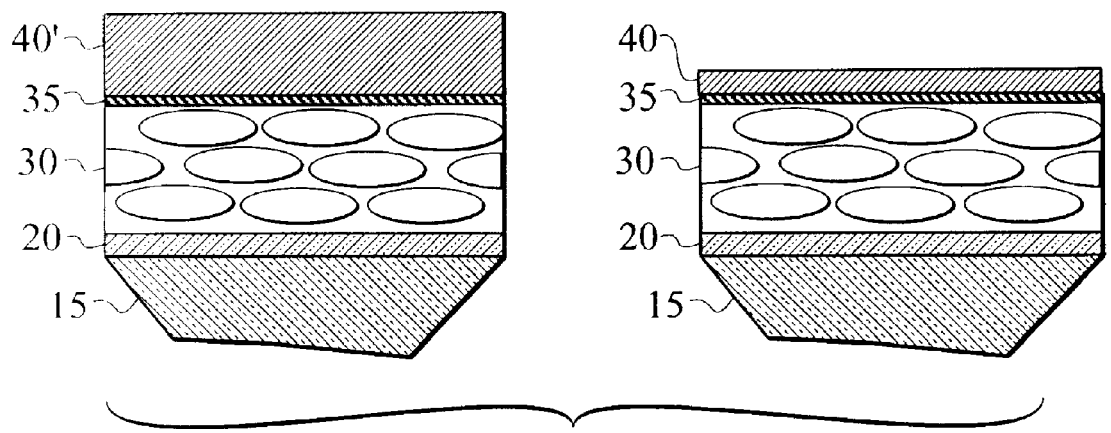
FIG. 5 is a first side sectional view of a display having a fluid deposited conductive layer in the wet and dried state.

FIG. 5 is a first side sectional view of a display having a fluid deposited conductive layer in the wet and dried state. On the left side of the drawing, a fluid second conductor 40' has been applied over other dried layers. In the disclosed preferred embodiment, fluid second conductor 40' is 25 microns thick and the remaining layers are approximately 10 microns thick. It is useful, but not necessary, for prior layers to use gelatin as a binder and further incorporate a cross-linking agent to prevent disruption by the application of a aqueous based fluid second conductor 40'. Fluid second conductor 40' is dried on the right side of FIG. 5 to create a conductive layer that can be patterned to form second conductors 40 that are less than 1 micron thick. It is desirable that the amount of material that creates second conductors 40 be significantly thinner and have less mass than dark layer 35 and light modulating layer 30 for laser ablation. Such layers are significantly thinner than the screen-printed materials disclosed in prior art, which are typically 15 to 25 microns thick. The thinner conductive layer reduces the cost of material for second conductor 40.

Figure 6:
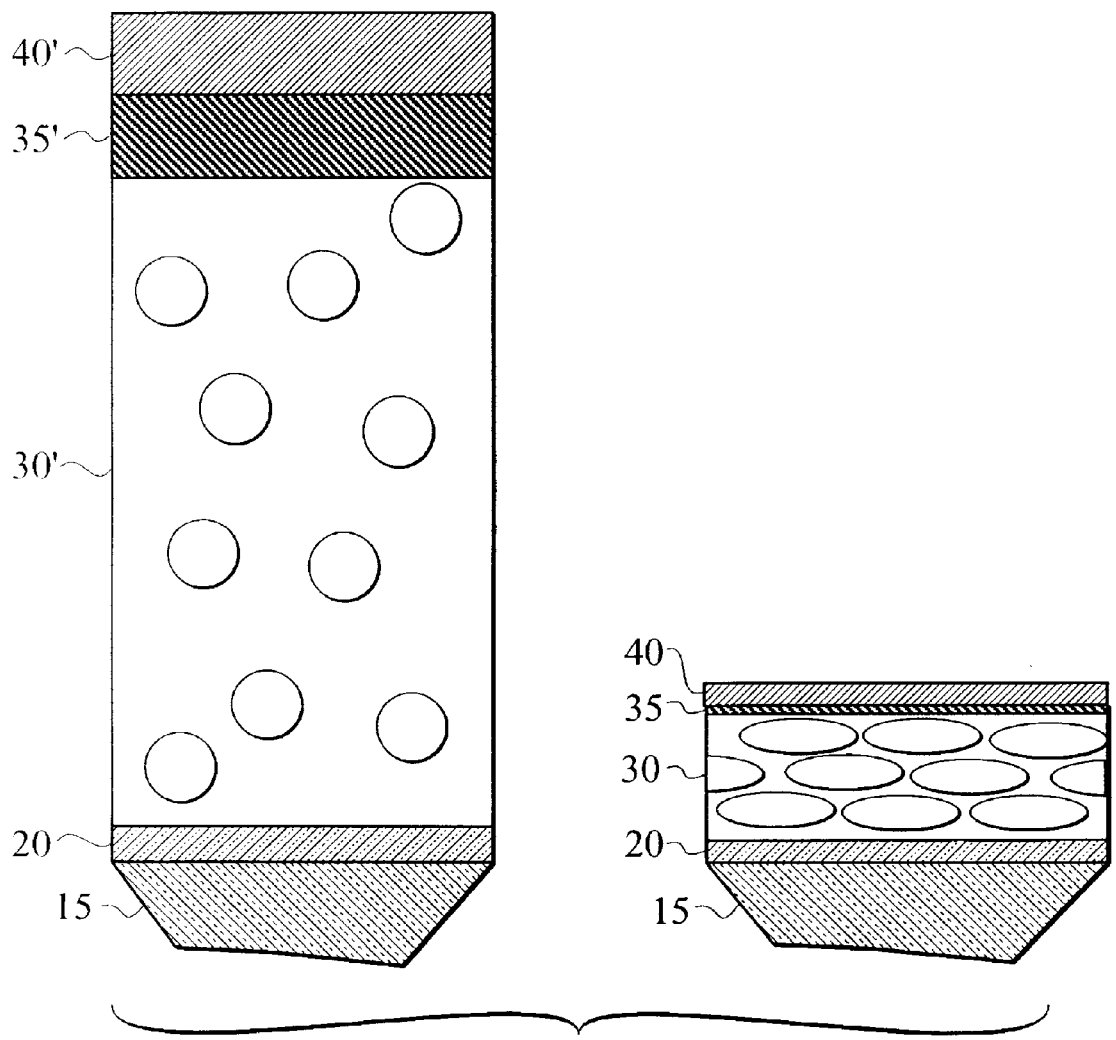
FIG. 6 is a second side sectional view of a display having a fluid deposited conductive layer in the wet and dried state.

FIG. 6 is a second side sectional view of a display having a fluid deposited conductive layer in the wet and dried state. In this embodiment, fluid light modulating layer 30', fluid dark layer 35' and fluid second conductor 40' are deposited simultaneously in accordance with the process shown in FIG. 4. The set of three fluid layers is on the order of 75 to 100 microns thick. Because fluid second conductor 40' lays on top of other fluidized layers, it is desirable that the dense conductive particles within fluid second conductor 40' not precipitate into the other fluidized layers. Silver particles that do not precipitate into an adjacent, fluidized layer should be under 5 micron mean diameter, and preferably under 2 micron in diameter. On the right side of FIG. 6, all three layers have been dried simultaneously to create a display structure ready for final laser patterning of the top conductive layer to form second conductors 40.

Figure 7:
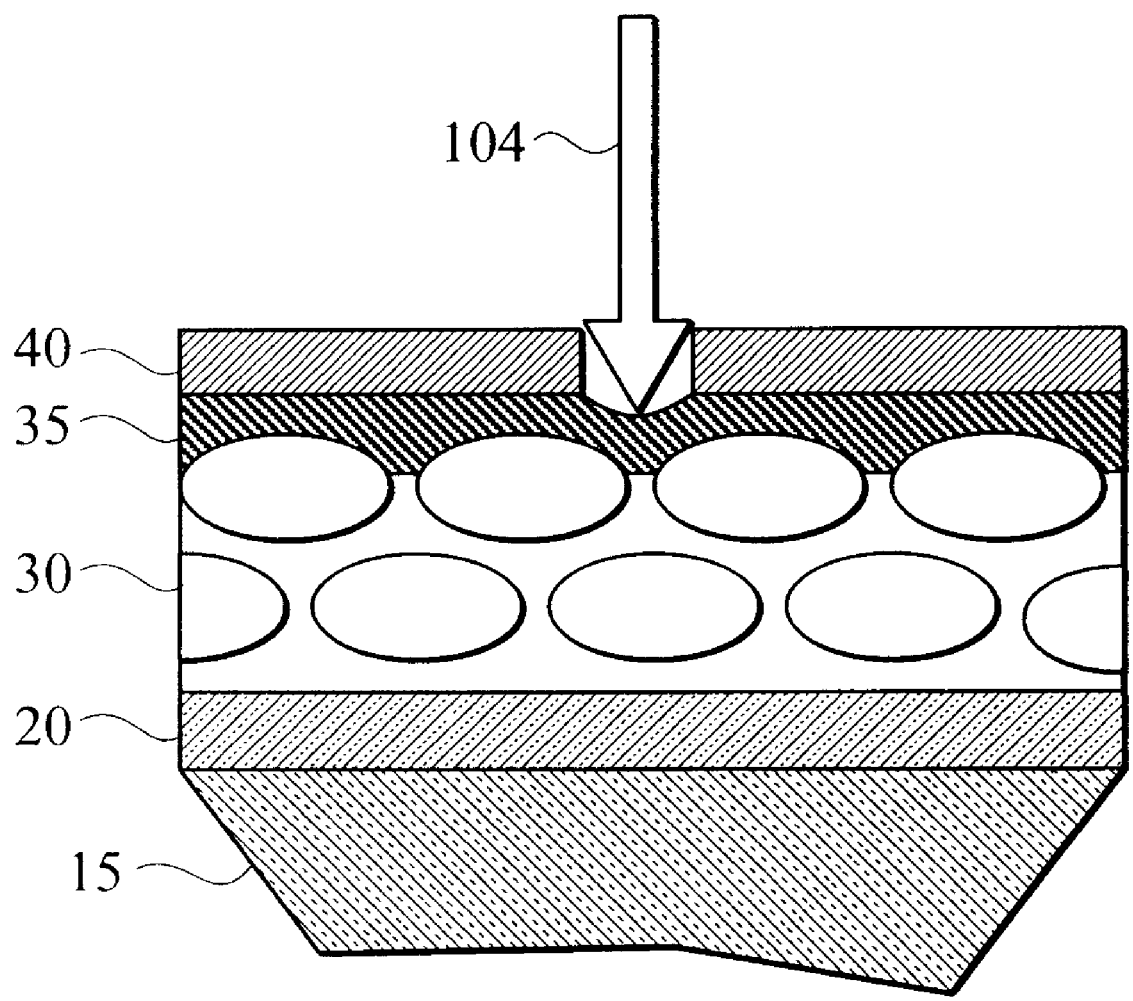
FIG. 7 is a side sectional view of a dried, fluid deposited conductor being etched by a laser beam.

FIG. 7 is a side sectional view of a dried, fluid deposited conductor being etched by a laser beam 104. In an experiment, fluid deposited coatings in accordance with the present invention were etched using a 4 watt Yttrium-Aluminum-Garnet (YAG) pulsed laser beam 104. Patterns were cut in the fluid deposited layer deposited for use as second conductor 40 in accordance according to the preferred embodiment without cutting through patterned first transparent conductor 20. In particular, the fluid deposited conductor was thin enough that dark layer 35 was not damaged. Dark layer 35 is useful in the invention for stopping excess levels of radiation from laser beam 104 above the energy level required to cut through the coated conductor layer.

The dark layer in this application can be formed of particulate material capable of absorbing high levels of laser energy before destruction. Dark layer 35 can incorporate, for instance, carbon or heavy metals that require high levels of energy for ablation. Dark layer 35 can further have reflective components that reflect rather than absorb excess laser energy.

Figure 8:
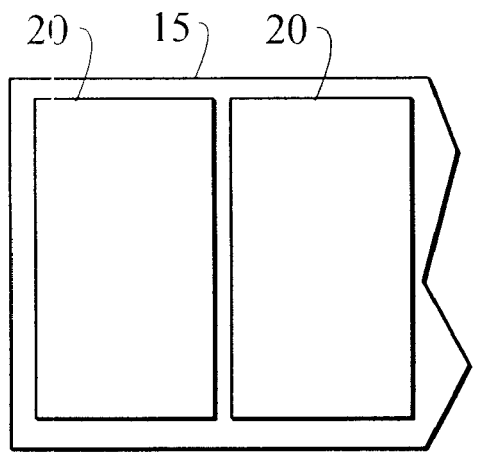
FIG. 8 is a rear view of a sheet in accordance with the present invention having a patterned first conductor.
Figure 9:
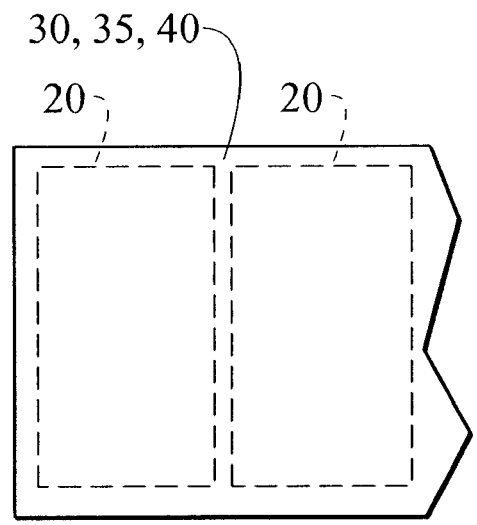
FIG. 9 is a rear view of a sheet in accordance with the present invention having a polymer-dispersed cholesteric liquid-crystal layer, a dark layer, and a fluid deposited conductive layer.
Figure 10:
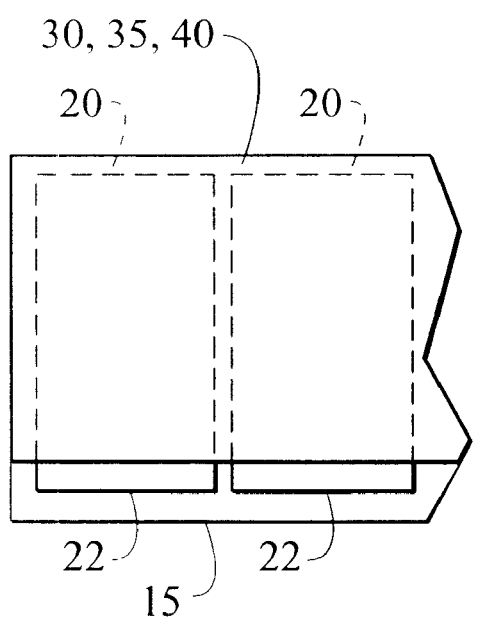
FIG. 10 is a rear view of a sheet in accordance with the present invention having exposed first conductors.

A process for fabricating display 10 will now be described using FIG. 8-FIG. 11. FIG. 8 is a rear view of a sheet in accordance with the one embodiment of the present invention, which sheet has a patterned first conductor 20. A substrate 15 is provided with a plurality of patterned first transparent conductors 20. FIG. 9 is a rear view of a sheet in accordance with the present invention having a polymer-dispersed cholesteric liquid-crystal light modulating layer 30, a dark layer 35 and a top coated continuum of conductive material. In the described embodiment, light modulating layer 30, dark layer 35 and the conductive continuum are co-deposited using a common binder, in one case gelatin, and dried. FIG. 10 is a rear view of a sheet in accordance with the present invention having exposed first conductors 22. Portions of light modulating layer 30, dark layer 35 and the conductive continuum are removed, for example, using a solvent, such as water, to form exposed first conductors 22.

Figure 11:
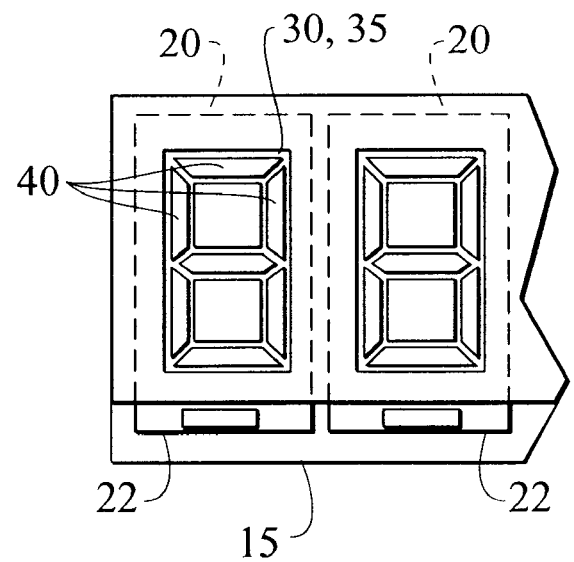
FIG. 11 is a rear view of a display in accordance with the present invention having second conductors etched into fluid deposited conductive layer.
Figure 12:
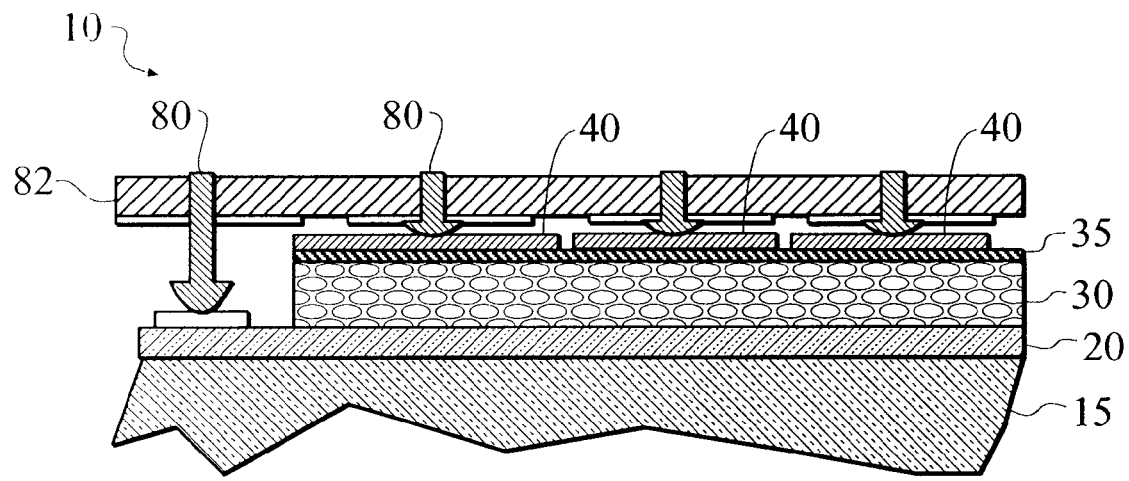
FIG. 12 is a section view of a display in accordance with the present invention attached to a circuit board.

FIG. 11 is a rear view of a display in accordance with the present invention having second conductors 40 etched into fluid deposited conductive layer. A YAG laser has been used to etch second conductors 40. Patterns can be of indicia, segments of a seven segment display or a set of adjacent traces that can be organized into a matrix displays, or combinations thereof. FIG. 12 is a section view of a display in accordance with the present invention attached to a circuit board. Contacts 80 on circuit board 82 provide electrical connection to each second conductor 40 and an associated transparent first conductor 20.

Figure 13:
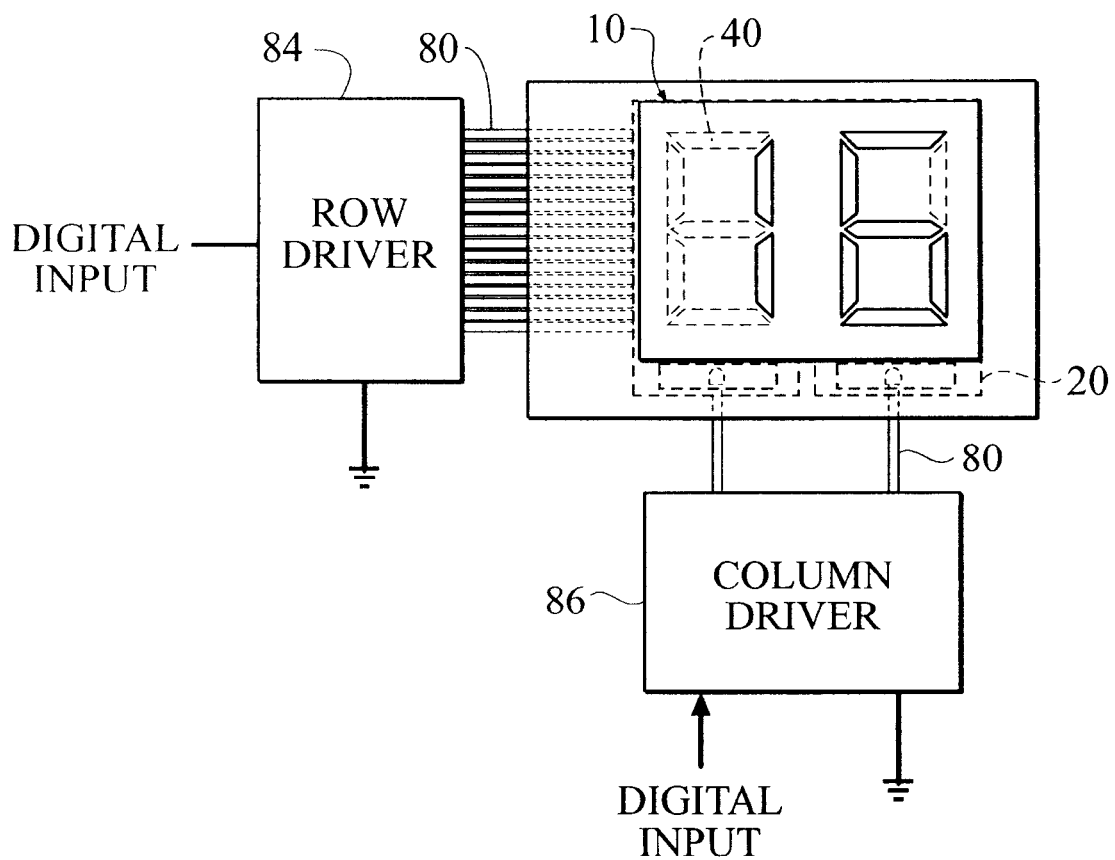
FIG. 13 is a front view of a display in accordance with the present invention connected to electric drive means.

FIG. 13 is a front view of a display in accordance with the present invention connected to electric drive means. Row driver 84 is connected by contacts 80 to second conductors 40. Column driver 86 is connected by contacts 80 to first transparent conductors 20. Display 10 can be organized with a contact 80 for each second conductor 40, or in the case of seven-segment displays, circuit board 82 can connect common segments of each character to a single contact 80. Display 10 can for instance be a matrix display, having a contact 80 each row of the matrix and each transparent first conductor 20 being connected to an output on column driver 86 through a contact 80. Electrical signals can be applied to row driver 84 and column driver 86 to write images onto display 10 in accordance with prior art.

The following examples are provided to illustrate the invention.

EXAMPLE 1

An experiment mixture was formed to demonstrate the possibility of forming the second conductor from a solution coating that has been laser-etched. A solution was formed consisting of:

|  |  |
|---|---|
| 2.86 gms. | Kodak gelatin, 40% concentration |
| 7.88 gms. | Metalor C-0083P fine silver, |
| 38.37 gms. | Deionized water |
| 0.25 gms. | Zonyl FSO surfactant |
| 0.65 gms. | thickening agent. |

The fine silver was Metalor Corporation material C-0083P, consisting of de-agglomerated silver particles having a size distribution of D10=0.5 um, D50=1.1 um and D90=2.0 um. The fluid contained approximately 2% volume dried gelatin and 1.50% volume of silver. The solution was coated at 24.9 cc/m² over the previously described layers and dried to form a conductive surface. An Yttrium-Aluminum-Garnet (YAG) laser emitting 4 watt output power at 1064 nanometers wavelength and focused to a 70 um diameter beam etched the coating at 1.78 meters per second without cutting through the transparent second conductors. The resulting second conductors had a sheet resistance of 80 ohms per square, which supported an electric field that switched cholesteric liquid crystal material between the focal-conic and planar states. Displays using the disclosed processes and materials were cycled every 10 seconds between the planar and focal-conic for one week. The 30,000 cycles were judged to be sufficient for certain applications. The fluid coated, dried and etched silver-particle second conductors had high reflectance throughout the visible spectrum, making the layer useful as a reflective second conductor for a dark layer acting as a color filter.

The invention has been described in detail with particular reference to certain preferred embodiments thereof, but it will be understood that variations and modifications can be effected within the spirit and scope of the invention.

The invention claimed is:

1. A display comprising
a substrate,
a first patternable coatable electrically conductive layer disposed over the substrate,
an imaging layer comprising light modulating material disposed over said first patternable fluid-coated electrically conductive layer, wherein said light modulating material has a first and a second field-switched stable optical state;
a dark layer disposed over the imaging layer and configured to at least one of absorb and or reflect radiation,
a second patternable coatable electrically conductive layer including a plurality of laser-etched conductors disposed over the dark layer, wherein said second patternable coatable electrically conductive layer includes fluid-coated electrically conductive metallic silver particles, said fluid-coated electrically conductive metallic silver particles having sufficient conductivity to induce an electric field strong enough to change the optical state of said light modulating material, and wherein the thickness of the second patternable coatable electrically conductive layer is less than 1 micron.

2. The display of claim 1 wherein the imaging layer contains a polymer dispersed cholesteric liquid crystal layer.

3. The display of claim 1 wherein said dark layer is a non-conductive color contrast layer.

4. The display of claim 1 wherein said fluid-coated electrically conductive metallic silver particles have a diameter of less than 1 micron.

5. The display of claim 1 wherein said fluid-coated electrically conductive metallic silver particles comprise metal flakes.

6. The display of claim 1 wherein said fluid-coated electrically conductive metallic silver particles have a diameter of less than 50 nm.

7. The display of claim 1 wherein said fluid-coated electrically conductive metallic silver particles are less than 10 cubic microns across the major length.

8. The display of claim 1 wherein said second patternable coatable electrically conductive layer further comprises a binder.

9. The display of claim 8 wherein said binder comprises gelatin.

10. The display of claim 8 wherein said binder is water soluble.

11. The display of claim 1 wherein said first patternable coatable electrically conductive layer comprises a fluid-coated electrically conductive material, wherein said fluid-coated electrically conductive material has sufficient conductivity to induce an electric field strong enough to change the optical state of said light modulating material.

12. The display of claim 1 wherein said fluid-coated electrically conductive metallic silver particles have a size distribution having 90 percent of the particles less than 5 microns in diameter.

13. The display of claim 1 wherein said dark layer comprises milled non-conductive pigments to absorb wavelengths of light in sub micron layers.

* * * * *

UNITED STATES PATENT AND TRADEMARK OFFICE
CERTIFICATE OF CORRECTION

| | | |
|---|---|---|
| PATENT NO. | : 8,085,363 B2 | Page 1 of 1 |
| APPLICATION NO. | : 11/533451 | |
| DATED | : December 27, 2011 | |
| INVENTOR(S) | : Stephenson et al. | |

It is certified that error appears in the above-identified patent and that said Letters Patent is hereby corrected as shown below:

<u>Column 9</u>
Line 26, "Modem" should read --Modern--.

<u>Column 21</u>
Line 45, "absorb and or reflect radiation," should read --absorb or reflect radiation; and,--.

<u>Column 22</u>
Line 33, "patternable" should read --patternable--.

Signed and Sealed this
Twenty-sixth Day of June, 2012

David J. Kappos
*Director of the United States Patent and Trademark Office*